US005503238A

United States Patent [19]
Urbánek et al.

[11] Patent Number: 5,503,238
[45] Date of Patent: Apr. 2, 1996

[54] SPRING MOUNTED TRACKED TRACTOR CHASSIS

[75] Inventors: Henrich Urbánek; Ján Vrabec, both of Martin, Slovakia

[73] Assignee: Ferram, spol. s r.o., Czechoslovakia

[21] Appl. No.: 313,157

[22] PCT Filed: Apr. 6, 1993

[86] PCT No.: PCT/CZ93/00010

§ 371 Date: Nov. 30, 1994

§ 102(e) Date: Nov. 30, 1994

[87] PCT Pub. No.: WO93/19975

PCT Pub. Date: Oct. 14, 1993

[30] Foreign Application Priority Data

Apr. 6, 1992 [CS] Czechoslovakia .................. 1031-92

[51] Int. Cl.$^6$ ........................... B62D 55/112; B62D 11/10
[52] U.S. Cl. ................................. 180/9.54; 180/6.7
[58] Field of Search ..................... 180/9.5, 9.54, 180/9.1, 6.2, 6.62, 6.7

[56] References Cited

U.S. PATENT DOCUMENTS

| | | | |
|---|---|---|---|
| 3,511,327 | 5/1970 | Schlör | 180/6.7 |
| 3,938,605 | 2/1976 | Koch | 180/9.5 |
| 4,519,654 | 5/1985 | Satzler et al. | 305/27 |
| 4,582,367 | 4/1986 | Jacquet et al. | 305/27 |
| 4,784,232 | 11/1988 | Leboime | 180/6.2 |
| 4,960,404 | 10/1990 | Reppert et al. | 475/23 |
| 5,286,044 | 2/1994 | Satzler et al. | 180/9.54 X |
| 5,409,075 | 4/1995 | Nieman | 180/9.5 |

FOREIGN PATENT DOCUMENTS

| | | |
|---|---|---|
| 0204037 | 12/1986 | European Pat. Off. . |
| 1514404 | 2/1968 | France . |
| 497672 | 5/1930 | Germany . |
| 3832529 | 3/1990 | Germany . |

*Primary Examiner*—Kevin T. Hurley
*Attorney, Agent, or Firm*—Burns, Doane, Swecker & Mathis

[57] ABSTRACT

A spring mounted tracked tractor chassis comprises a double-armed balance beam, having upper and lower arms, rotatably mounted by the lower arm to a main arm. The balance beam carries a journal of a tensioning wheel and its upper arm is rotatably connected with a tension jack arranged on the main arm. Running wheels of the chassis are secured on the main arm through rockers with primary springs inserted therebetween. A secondary spring is mounted between the main arm and a console located on the tractor body. A drive wheel rotational axis is positioned below and behind the rotational axis of a countershaft of a portal gear. The rotational axis of the countershaft is positioned below and behind the rotational axis of a ring gear of a bevel gear.

36 Claims, 6 Drawing Sheets

SPRING MOUNTED TRACKED TRACTOR CHASSIS

BACKGROUND OF THE INVENTION

1. Field of the Invention

This invention relates to a spring mounted tracked tractor chassis.

2. Description of the Related Art

Spring mounted tracked tractor chassis are known, in which the traversing wheels are mounted on the frame. In the known structures, the frame appears to be an indispensable element even in those cases, when for constituting a tracked tractor a self-supporting body of a wheel tractor is used.

The disadvantage of such designs consists in that the frame substantially increases the mass of the tractor and limits the accessibility of the body. Moreover, the tractor is deflected backwards by the heaviness of the trailer tools on a three-point suspension, or by soil resistance.

Furthermore, tracked tractor chassis are known, in which the driving wheels are mounted within the region of the cone gearing and the differential planet reducers. The disadvantage of those designs consists in that the three-point suspension is situated at a considerable distance behind the axis of the rear wheels. Thus, the tilting moment, by which the tractor is effected by the trailer tools in longitudinal direction, is increased. A high tilting moment causes an unfavourable distribution of pressure under the tractor tracks, and reduces the lifting force of the machine.

OBJECTS AND SUMMARY OF THE INVENTION

The object of the present invention is to design a spring mounted tracked tractor chassis, which can be fit directly on the tractor body, and which substantially reduces the disadvantages of the known types of designs discussed above.

In the tracked tractor chassis according to one aspect of the present invention, a double-armed balance beam is mounted rotatably by its lower arm on a main arm. The balance beam carries the journal of a tensioning wheel, and its upper arm is rotatably connected with a tension jack arranged on the main arm. The running wheels of the chassis are secured on the main arm by means of rockers with primary springs inserted therebetween. On the main arm, a secondary spring is supported from above, and is secured to a console mounted on the tractor body. The axis of the drive wheel is positioned below and behind the axis of a countershaft of a portal gear, as well as the axis of a countershaft with respect to the axis of a ring gear of the bevel gear.

In an advantageous embodiment of the chassis, both the primary and the secondary spring are made in the form of air bellows, of which the filling is controlled by position controllers. The tie rods of the position controllers are provided with length positioning devices, which are connected to the spring loading controller mounted in the tractor cab.

The primary spring of the second to last running wheel is advantageously connected with the primary spring of the last running wheel through a reducing valve, of which the operating member is connected to a grading piston. The grading piston closes a chamber on one side, which is connected to the primary spring of the last running wheel, and closes a double chamber on the other side of the piston, of which the first part is connected with the primary spring of the second to last running wheel while the second part is connected to the tension jack cylinder.

The first running wheel is connected with the second running wheel by means of a connecting rocker, mounted on the main arm by a rocker with a primary spring. The primary spring is inserted between the rocker and the main arm.

Between the rocker of the last running wheel and the main arm, a compensating hydraulic motor is inserted, which is connected with the cylinder of the tension jack by a piping with an inserted flow damper. The primary springs of both the first and the second running wheels are interconnected by a piping with a secondary spring.

The rocker of the last running wheel is connected with the main arm by means of a primary damper, and the main arm is connected, by means of a secondary damper, with a bracket on the body of the tractor.

In an advantageous embodiment of the chassis, the ring gear of the cone drive is mounted on a tubular bracket, which is connected, over an external grooved driver and an inner grooved driver, with a hollow shaft, at the ends of which are mounted the crown wheels of the differential planet reducers. One of the differential planet reducers has a hollow central wheel, which is connected to the hollow wheel of the drive control. In the hollows of the drive control wheel, the hollow central wheel, and the hollow shaft, a central shaft is mounted, which connects the second differential planet reducer with the second wheel of the drive control.

The hollow wheel of the drive control and the second wheel of the drive control can be in mesh by intermediary of a common conical pinion, which is connected to the shaft of the hydraulic drive motor.

The hollow wheel of the drive control and the second wheel of the drive control are in mesh with a pinion, which is connected to the shaft of the hydraulic motor in such manner, that one of the drive control wheels is in direct mesh with the pinion. The other drive control wheel is in mesh with the pinion by means of an intermediate gear.

The hollow wheel of the drive control, the second wheel of the drive control, and the shaft of the hydraulic motor of the drive control can be mounted in a housing of the drive control, which is mounted on the housing of the portal gearing on the side of the differential planet reducer, which is provided with a hollow central wheel. The hollow shaft is advantageously provided with a gearing, which is in mesh with the brake discs.

The countershafts are, by intermediary of the intake wheels of the portal gearing, in mesh with the toothed rims, which are mounted on the planet wheel drivers of the differential planet reducers. The pinion of the countershaft of the portal gearing reaches into the hollow of the driving wheel, and the portal gearing casing ends into the supporting pin, on which the driving wheel is mounted, and on the face sides of which are mounted armature pins.

The tire of the driving wheel can be mounted in the fork of the main arm in the sleeves of the roller bearings, which are mounted on armature pins, and the portal gearing casing can project above the fork into the hollow of the driving wheel.

The lower arm of the two arm rocker is mounted rotatably on the main arm by intermediary of a lower pin, the axis of which is below, and in front of the axis of the tensioning wheel.

The stationary part of the brake is mounted on a double armed balance wheel, and the rotary part of the brake is connected to the tensioning wheel. The stationary part of the brake can be mounted on the double armed balance wheel by means of the tensioning wheel pin, and a flange. To the tensioning wheel, a brake hub is connected, which is provided about its circumference with grooves, directed parallely with the axis of the tensioning wheel. In the grooves, the hub of the brake disk is displaceably mounted.

The driving wheel is provided with fingers, which are positioned in regular gaps in the groove about the circumference of the driving wheel between the cleaning openings.

On the main arm, a movable armature is advantageously mounted, and, on the self-supporting tractor body, a stationary armature is mounted. The two armatures are connected by a brace. The bracket is provided with a guide plate, which is mounted between two vertical bars, mounted on the main arm. Between the guide plate and at least one bar, a block can be inserted which is fixed on the slide plate, as well as on the vertical bar.

The tensioning wheel, mounted at the end of the main arm, is spring-loaded by a secondary spring. The main arm deflects in a vertical plane around the driving wheel axis, and the belt length remains unchanged. The running wheels are spring-loaded in relation to the main arm, and it is possible to adjust their vertical position. When the spring-loaded running wheels are in the bottom position, the stationary driving wheel is in a lifted position above the ground. In this manner, the wheels are able to run at a higher speed. If, on the other hand, the running wheels are lifted, the driving wheel moves down and the belt below it leans against the ground. Thus, the contact surface of the belt is extended with the ground and the stability of the tractor in relation to the buckling moment is increased, said buckling moment being evoked in the longitudinal direction by the trailer tools and the ground resistance. In such manner, the tractor is prepared for operational application. The spring mounting operating device in the cab controls the spring positioning adjusters and makes it possible to adapt, in accordance with necessity, the chassis either to high speed operation or to operational application. By common control of all position adjusters, the correct position of the tractor is secured at any operating mode.

The primary spring of the second to last running wheel is inflated with air from the primary spring of the last running wheel via a pressure reducing valve. This compensates the tension of the belt for operation with the tensioning wheel lifted. Thus, the axle load is independent of the tension in the belt. A similar effect is obtained also by the compensating motor, which is inserted between the rocker of the last running wheel and the main arm. The hydraulic connection of the compensating hydraulic motor and the tension jack makes it possible to apply the liquid, delivered by engagement of the last running wheel, for the disengagement of the driving wheel.

The proposed arrangement of the tubular bracket of the gear carrier, the hollow shaft and the central shaft makes possible to use the conical gear and the brakes from the original wheel tractor. This arrangement makes further possible to connect the hydraulic drive control motor with both differential planet reducers, without the necessity of redesigning the central part of the rear housing of the original wheel tractor.

The control drive housing represents an independent design group, which can be, when needed, mounted on the casing of the differential planet reducer.

The arrangement of the drive control hollow wheel and the second drive control wheel, which are in engagement with a common pinion, makes it possible for the attachment of the hydraulic drive control motor without requiring a modification of the original wheel tractor body.

The portal gearing with the countershaft and the exit gear is made in such a manner, that the axis of the drive wheel is situated, below and behind the axis of the countershaft. In addition, the axis of the countershaft is situated below and behind the axis of the gear in the conical gearing. This double backward displacement has the effect, that the axis of the driving wheel is situated in a substantial gap behind the gear axis, which makes it possible to maintain on the body of the redesigned wheel tractor the complete three-point suspension with the hydraulic device without any changes. When the driving wheels are lowered, then the three-point suspension of the tractor is situated in the region of the belt contact surface. Thus, the resistance of the tracked tractor against the tilting moment from the trailer tools.

According to another aspect of the invention, the portal gearing casing, together with the exit gear pinion, engages the hollow of the driving wheel above the main arm fork. Thus, the clearance of the vehicle above the ground and its passability through the ground are increased.

In accordance with another aspect of the invention, the stationary part of the brake is mounted on a double arm balance wheel, or possibly on the pin of a tensioning wheel. Thus, the braking torque is transferred to the double armed balance wheel and consequently, the belt tension is increased. This increases the reliability of the braking effect transfer from the tensioning wheel to the belt. The displacement of the axis of the double arm balance wheel in relation to the axis of the tensioning wheel increases the belt tension, and consequently the axle load in the tensioning wheel. Thus, the effect of impacts from soil unevenness on the belt prestress is also reduced.

The invention can be advantageously used for redesigning a wheel tractor to a universal tracked tractor, by maintaining the majority of the design sets of the original wheel tractor. This applies to the following sets: body, engine accessories, bonnet, cabin, front and rear three-point suspension with hydraulic device, and the front and rear weight. In comparison with the known designs, the tractive force of the tractor according to the present invention, its velocity and the driver's comfort is increased, as well as the aggregability of the tractor.

BRIEF DESCRIPTION OF THE DRAWINGS

The present invention is explained by means of exemplary embodiments in drawings, of which.

DETAILED DESCRIPTION OF THE PREFERRED EMBODIMENT

Figure 1:
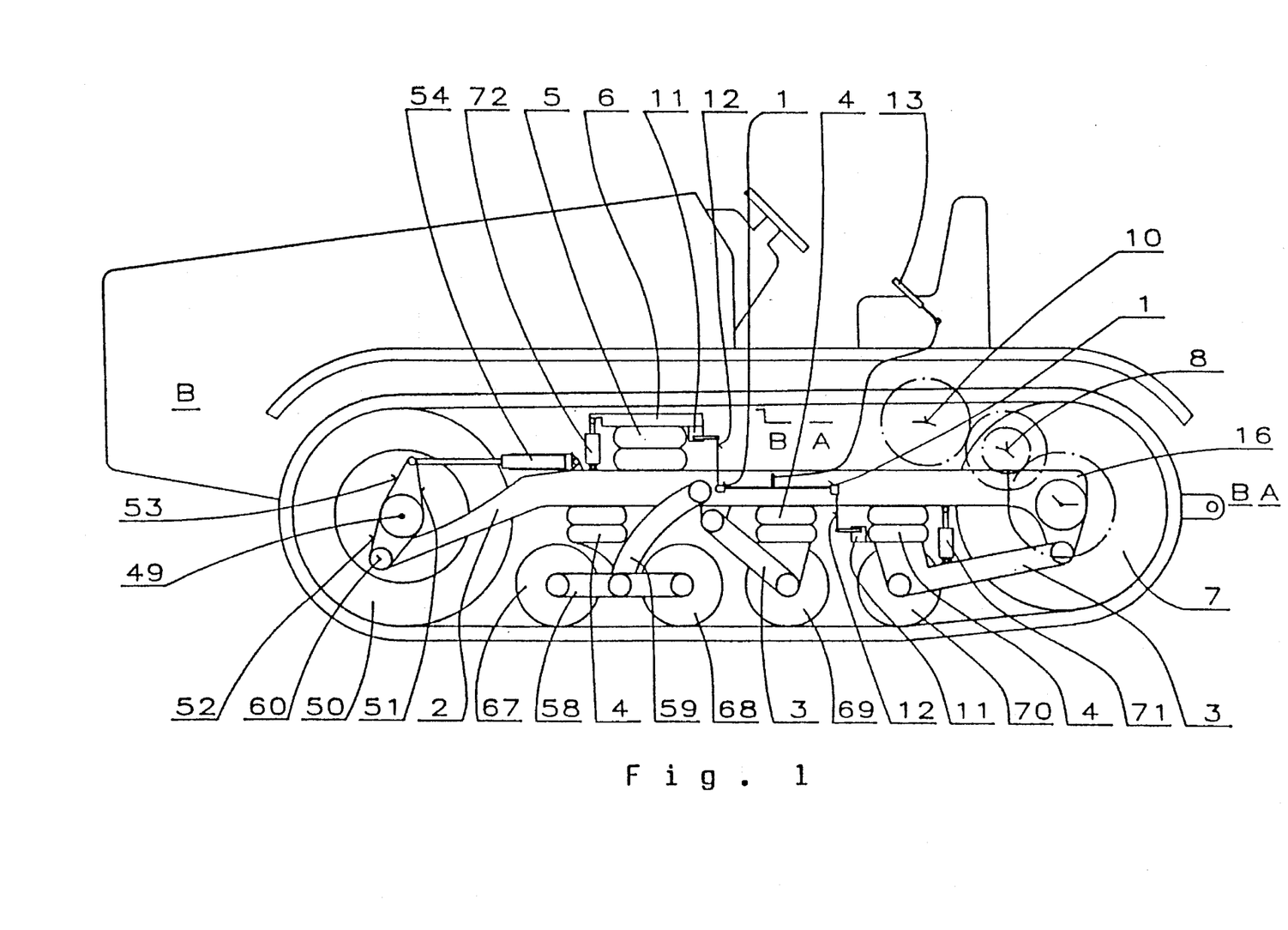
FIG. 1 is a side view of the present invention in which the first and the second running wheels are interconnected by means of a connecting balance beam.
Figure 4:
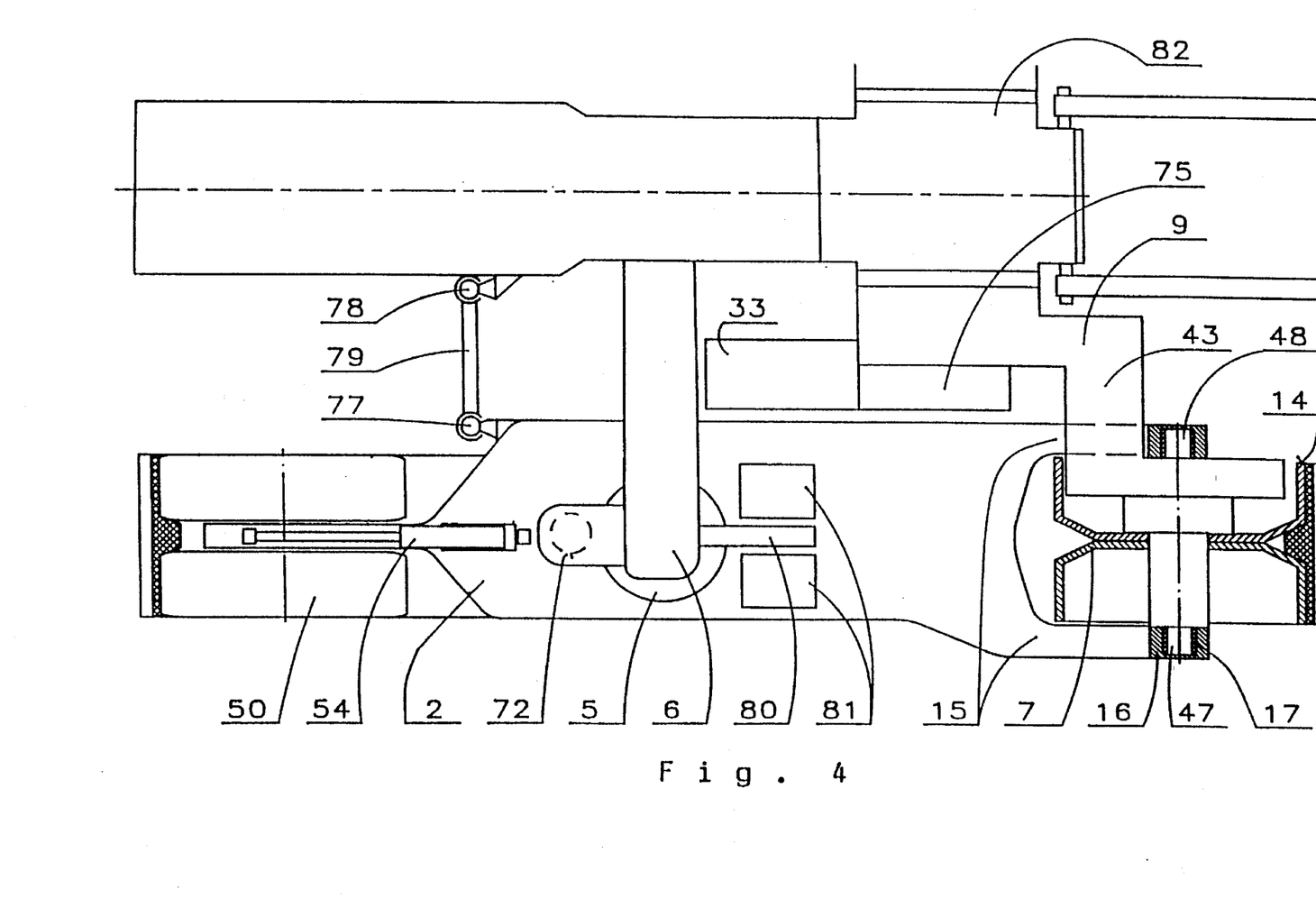
FIG. 4 is a diagrammatical top view of the self-supporting tractor body with portal gearing, control drive casing and belt chassis taken along section line B—B in FIG. 1.

In the spring mounted tracked tractor chassis, the journal 49 of the tensioning wheel 50 carries a double arm balance wheel 51, of which the lower arm 52 is mounted rotatably on the main arm 2 by means of lower pin 60, while its upper arm 53 is pivotally connected with tension jack 54, mounted to main arm 2. The axis of lower pin 60 is situated below, and simultaneously in front of the axis of journal 49 of tensioning wheel 50. The second to last running wheel 69 and the last running wheel 70 are fastened to the main arm 2 by means of rockers 3 with primary springs 4, which are inserted between the rockers 3 and the main arm 2. The first running wheel 67 is connected with the second running wheel 68 by a connecting balance beam 58, which is mounted on the main arm 2 by means of rocker 59 and the primary spring 4. The primary spring 4 is inserted between rocker 59 and main arm 2. On an upper side of the main arm 2, secondary spring 5 leans against main arm 2. As shown in FIG. 4, the secondary spring 5 is fastened to bracket 6 formed on the self-carrying body 22 of the tractor.

Both the primary springs 4, and the secondary spring 5 are air bellows. The axis of the drive wheel 7 is positioned in back of and below the axis of countershaft 8 of portal gear 9 and also the axis of countershaft 8 is situated in back of and below the axis of gear 10, of the conical drive. Rocker 3 of the last running wheel 70 is connected with main arm 2 by means of a primary damper 71, and the main arm 2 is connected with bracket 6 by means of a secondary damper 72.

Figure 2:
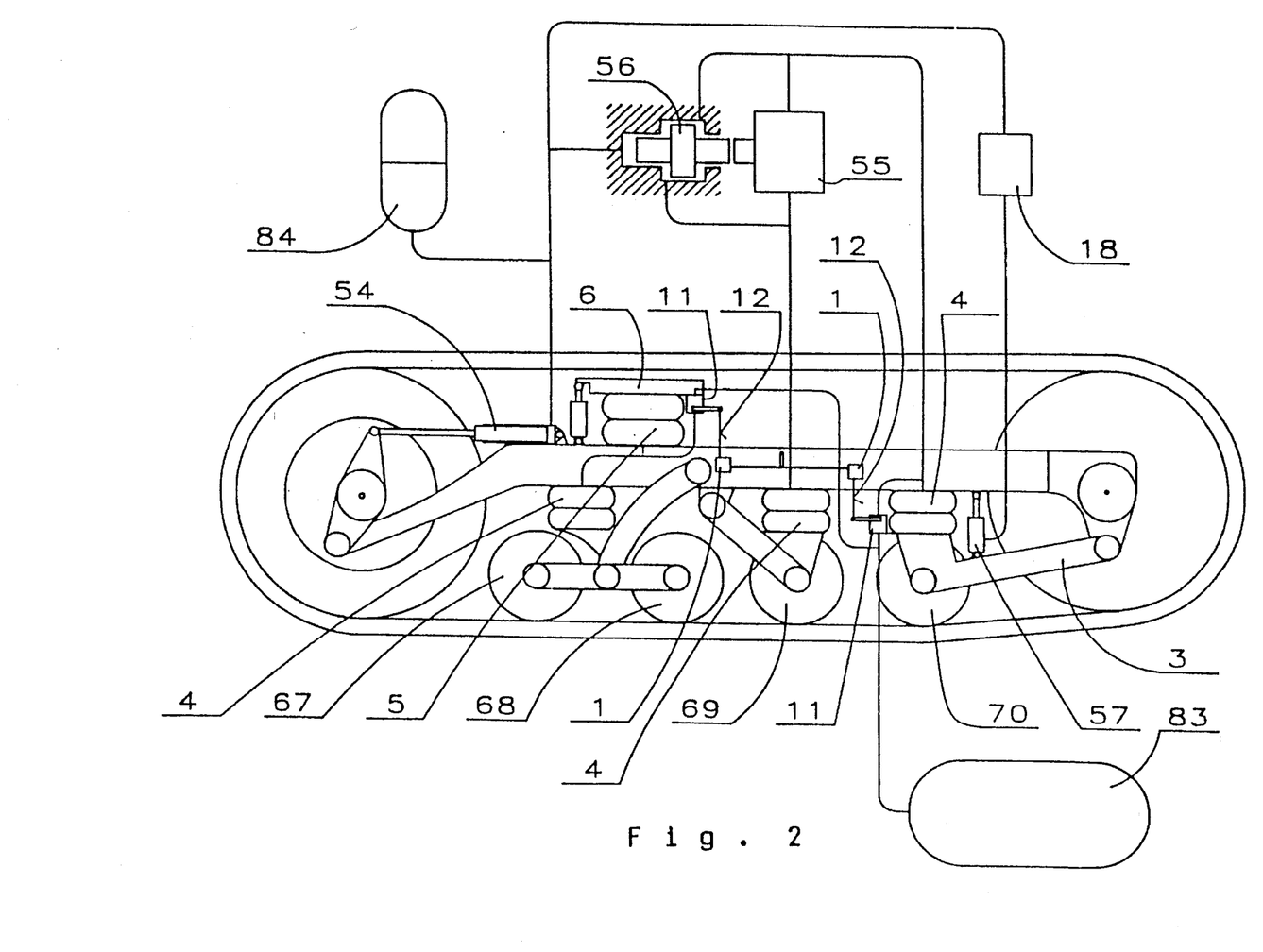
FIG. 2 is a schematic diagram of the pneumatical interconnection of the primary springs via a pressure reducing valve, interconnection of both primary and secondary springs, and attachment of a compensating hydraulic motor.

The chassis is designed in such manner, that the primary spring 4 of the last running wheel 70 and the secondary spring 5 are filled from the air container 83, shown in FIG. 2, via position controller 11, the tie rods 12 of which are provided with length adjusting devices 1, which are connected to the spring mounting controller 13 in the tractor cab.

Primary spring 4 of the second to last running wheel 69 is in connection with the primary spring 4 of the last running wheel 70 via pressure reducing valve 55, of which the control element is connected to graded piston 56. The graded piston 56 has on one side a chamber connected to primary spring 4 of the last running wheel 70. A double chamber is provided on the other side of the graded piston 56, of which the first part is connected with primary spring of the second to last running wheel 69, and the second part is connected with the cylinder of tension jack 54. Tension jack 54 is in connection with hydropneumatical spring 84. Between the rocker 3 of the last running wheel 70 and the main arm 2, a compensating hydraulic motor 57 is mounted, which is connected to the cylinder of tension jack 54 by means of a piping with a flow damper 18 connected thereto. Primary spring 4 of both the first and the second running wheels 67,68 is connected by a piping to secondary spring 5.

Figure 3:
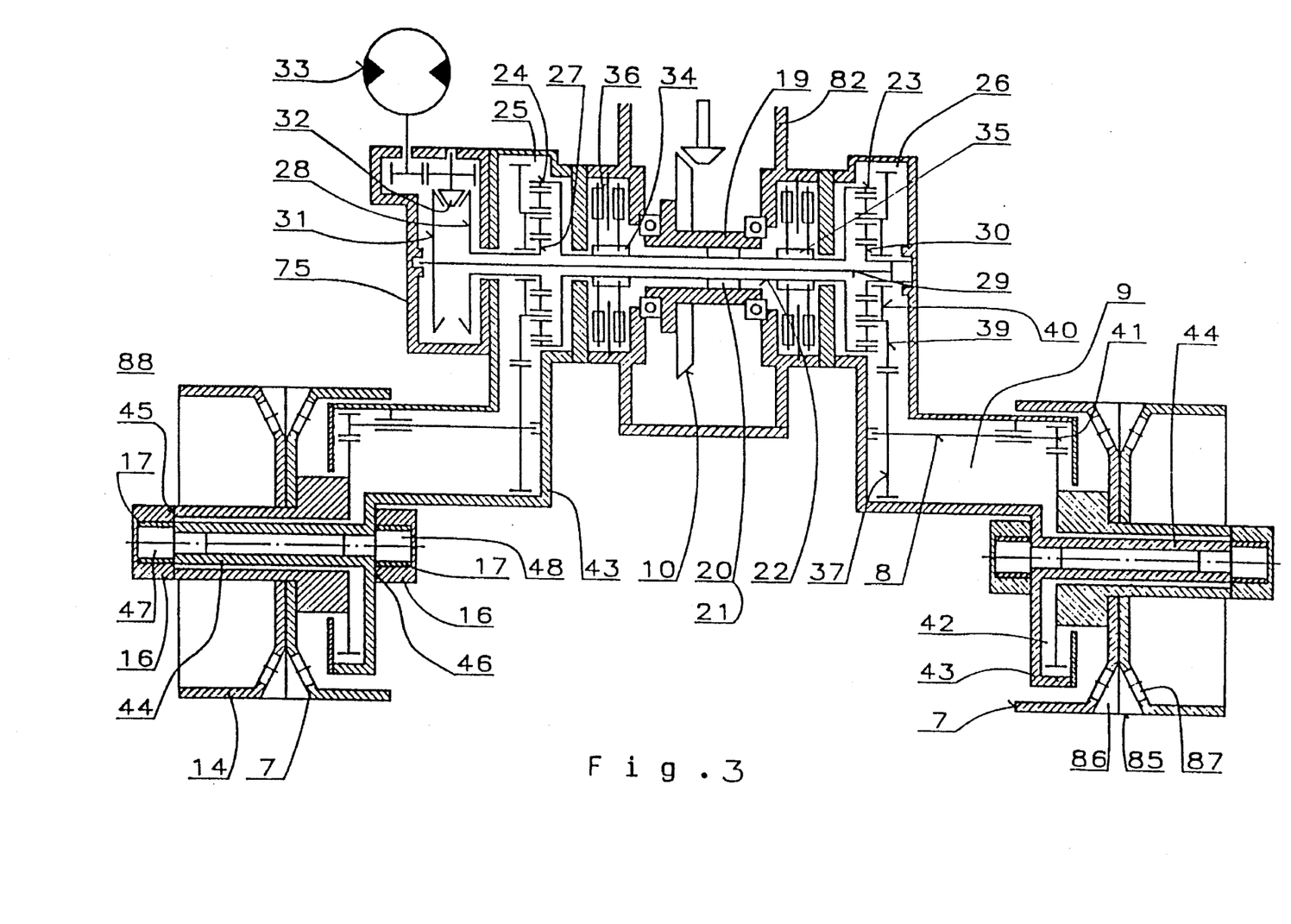
FIG. 3 is a diagrammatical top view of the driving wheels taken along section line A—A in FIG. 1.

In the chassis represented in FIG. 3, the ring gear 10 of the conical gear is mounted on tubular bracket 19, which is connected to hollow shaft 22 by outer grooved driver 21 and inner grooved driver 20. At the ends of hollow shaft 22 are mounted the crown wheels 23,24 of the differential planet reducers 25,26. One of the differential planet reducers 25 has a hollow central wheel 27, which is connected with the drive control hollow wheel 28. In the hollow of drive control wheel 28 of the central wheel 27 and the hollow shaft 22, central shaft 29 is mounted, which connects the central wheel 30 of the second differential planet reducer 26 with the second wheel 31 of the drive control. The hollow wheel 28 of the drive control and the second drive control wheel 31 are connected by means of a common conical pinion 32. The conical pinion 32 is connected with the shaft of the hydraulic drive motor 33 of the control drive. The hollow wheel 28 of the drive control, the second wheel 31 of the drive control, and the shaft of the hydraulic drive motor 33 are mounted in the control drive housing 75, which is mounted on the housing of the portal gear 9 on the side of the differential planet reducer 25, which is provided with a hollow central wheel 27. The hollow shaft 22 is provided with gearings 34,35, on which brake discs 36 are mounted.

The countershafts 8 of the portal gear 9 are in mesh with toothed rims 39 by intermediary of intake wheel 37. The toothed rims 39 are mounted on the planet wheel drivers 40 of the differential planet gears. The countershafts 8 of the portal gears 9 mesh by pinions 41 of the exit gears 42 into the hollow spaces of drive wheels 7. The casing 43 of portal gear 9 receives a supporting pin 44, on which is mounted drive wheel 7. The front walls 45,46 of the casing 43 armature pins 47,48 are mounted. Drive wheel 7 is provided with fingers 85, which are positioned in regular intervals in the groove 86 about the circumference of drive wheel 7 between purifying orifices 87.

In the chassis, as shown in FIG. 4, the tire 14 of the driving wheel 7 is mounted in the fork 15 of main arm 2 in bearing sleeves 16 of roller bearings 17, which are put on armature pins 47,48. Casing 43 of portal gear 9 projects above fork 15 into the hollow of drive wheel 7. On main arm 2 is mounted a movable armature 77, and on the self-carrying body 82 of the tractor, a stationary armature 78 is mounted. Both armatures 77,78 are connected by brace 79. This brace 79 can be replaced by a sliding plate 80, which is mounted on bracket 6 and interposed between two vertical strips 81, which are fastened on main arm 2.

Figure 5:
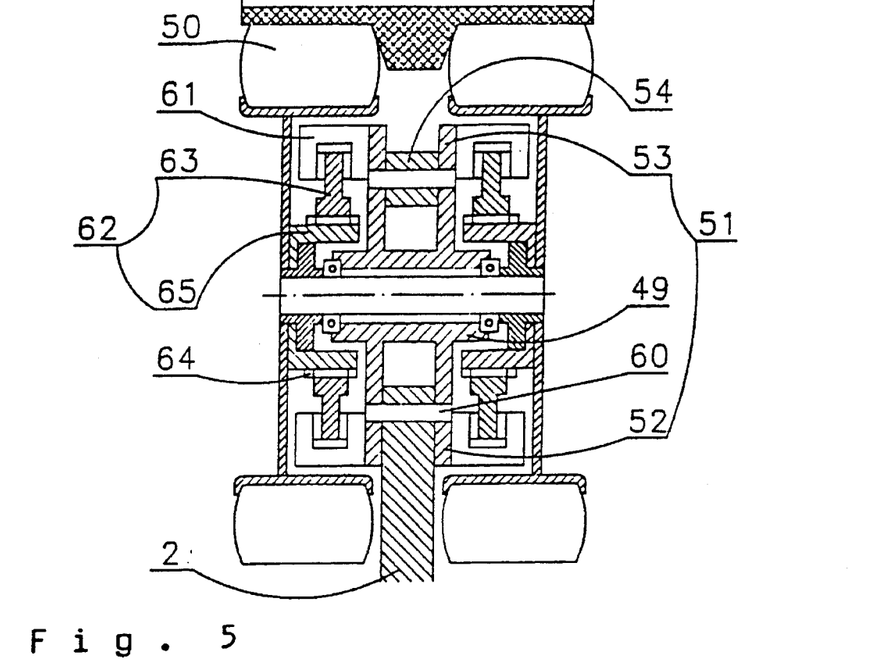
FIG. 5 is a cross section through the tensioning wheel and the double-armed balance wheel with the stationary brake part.

In the chassis as shown in FIG. 5, the stationary part 61 of the brake is mounted on the double armed balance wheel 51, and the rotary part 62 of the brake is connected with tensioning wheel 50. The tensioning wheel 50 is connected to the brake hub 65, which is provided on its circumference with grooves 64, running parallel to the axis of tensioning wheel 50. In the grooves 64, the hub of brake disk 63 is rotatably mounted.

Figure 6:
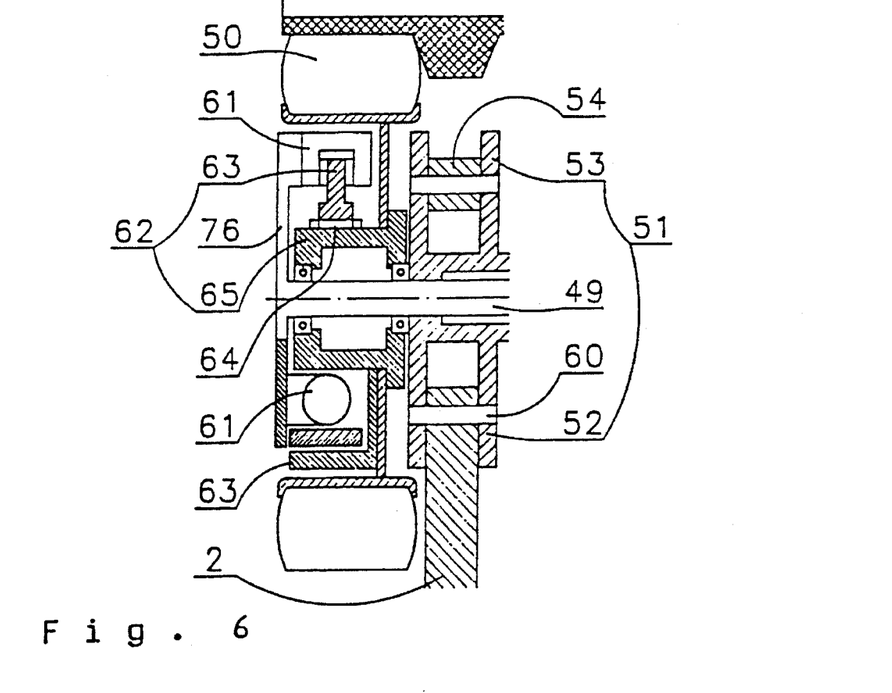
FIG. 6 is a cross section through the tensioning wheel and the double-armed balance wheel with the stationary brake part, according to a second embodiment with a disk brake, represented above the axis of the tensioning wheel, and a third embodiment with a drum brake, represented below the axis of the tensioning wheel.
Figure 7:
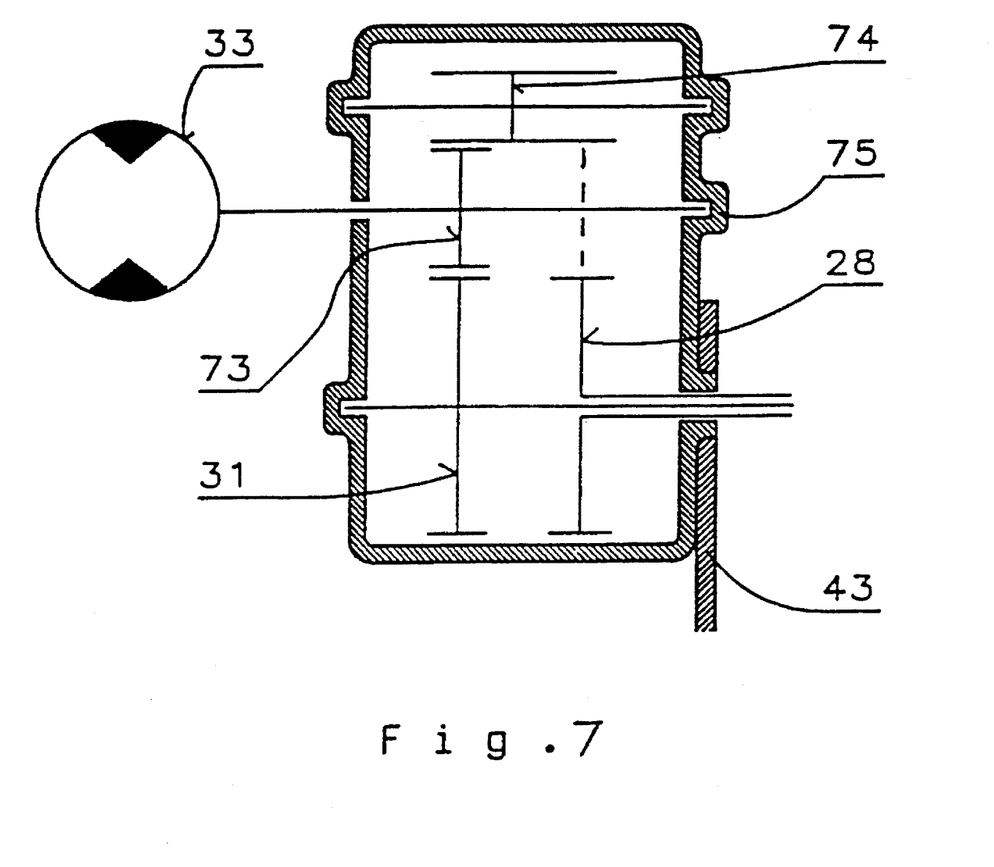
FIG. 7 is an diagrammatical top view of an alternative embodiment of the control drive with an intermediate gear.

The upper half of FIG. 6 represents a stationary part 61 of the brake, mounted on the double arm balance wheel 51 by means of tensioning wheel 50 journal 49 and by means of flange 76. The rotary part 62 of the brake consists of a brake disk 63 mounted displaceably in grooves 64. The grooves are milled on the brake hub 65, which is connected to tensioning wheel 50. In the lower half of FIG. 6, an alternative embodiment with a drum brake is represented. FIG. 7 represents an alternative design of control drive 75, in which the hollow wheel 28 of the drive control and the second wheel 31 of the drive control are in mesh with pinion 73, which is connected to the shaft of the hydraulic drive motor 33 in such manner, that one of the wheels 28,31 of the drive control is in direct mesh with pinion 73, while the other is in mesh with pinion 73 by intermediary of interposed wheel 74.

We claim:

1. Spring mounted tracked tractor chassis, provided with a pair of main arms mounted rotatably on a body of the tractor, driving wheels of the chassis being driven from a cone drive gear by intermediary of a pair of differential planet reducing gears with linked-up portal gearings, characterized in that each of the main arms includes a journal (49) of a tensioning wheel (50) which carries a double arm balance wheel (51), of which a lower arm (52) is mounted rotatably on the main arm (2), and an upper arm (53) of which is rotatably connected with a tension jack (54) mounted on the main arm (2), a plurality of running wheels (67,68,69,70) being mounted on the main arm (2) by rockers (3,59) with primary springs (4) inserted between the rockers (3,59) and the main arm (2), a secondary spring (5) bearing on the main arm from above, said secondary spring being mounted on a bracket (6) of the tractor body (82), while an axis of one of the drive wheels (7) is situated, behind and below an axis of a countershaft (8) of a portal gear (9), the axis of the countershaft (8) is positioned behind and below an axis of a ring gear (10) of the cone drive gear.

2. Chassis as claimed in claim 1, characterized in that the primary springs (4) and the secondary spring (5) are made in the form of air bellows, of which the filling is controlled by position controllers (11), a plurality of tie rods (12) connected to the position controllers are provided with length adjusting devices (1), connected to a spring mounting controller (13) in a tractor cab.

3. Chassis as claimed in claim 1 characterized in that the primary springs (4) of a second to last of the running wheels (69) are interconnected with the primary springs (4) of a last of the running wheels (70) via a pressure reducing valve (55), a control member of which is connected with a graded piston (56), which on one side closes a chamber interconnected with the primary spring (4) of the last running wheel (70), and on the other side closes a double chamber, of which a first part is interconnected with the primary spring (4) of the second to last running wheel (69), and a second part with a cylinder of the tension jack (54).

4. Chassis as claimed in claim 1, characterized in that a first of the running wheels (67) is connected with a second of the running wheels (68) by intermediary of a connecting rocker beam (58), which is mounted on the main arm (2) by means of one of the rockers (59) with the primary spring (4), which is interposed between the rocker (59) and the main arm (2).

5. Chassis as claimed in claim 1, characterized in that between a rocker (3) of a last of the running wheels (70) and the main arm (2) is interposed a compensating hydraulic motor (57), which is interconnected with a cylinder of the tension jack (54) by piping with a connected flow damper (18).

6. Chassis as claimed in claim 1, characterized in that the primary springs (4) of both a first and a second of the running wheels (67,68) are interconnected by piping with the secondary spring (5).

7. Chassis as claimed in claim 1, characterized in that a rocker (3) of a last of the running wheels (70) is connected by intermediary of a primary damper (71) with the main arm (2), and the main arm (2) is connected by intermediary of a secondary damper (72) with a bracket (6).

8. Chassis as claimed in claim 1, characterized in that the ring gear (10) of the cone drive gear is mounted on a tubular bracket (19), which is connected by an outer grooved driver (21) and an inner grooved driver (20) with a hollow shaft (22), at the ends of which are mounted crown wheels (23,24) of the differential planet reducing gears.

9. Chassis as claimed in claim 1, characterized in that one of the differential planet reducing gears (25) has a hollow central wheel (27), which is connected to a hollow wheel (28) of a control drive, and in a hollow of the wheel (28) of the control drive, and in a hollow of the central wheel (27), a hollow shaft (22) and a central shaft (29) are mounted, the central shaft (22) connects a central wheel (30) of a second of the differential planet reducing gears (26) to a second wheel (31) of the control drive.

10. Chassis as claimed in claim 9, characterized in that the hollow wheel (28) of the control drive, and the second wheel (31) of the control drive are in engagement by intermediary of a common conical pinion (32), which is connected to a shaft of a hydraulic motor (33) of the control drive.

11. Chassis as claimed in claim 9, characterized in that the hollow wheel (28) of the control drive, and the second wheel (31) of the control drive are in mesh with a pinion (73), which is connected to a shaft of a hydraulic motor (33) of the control drive in such manner, that one of the hollow wheel (28) and the second wheel (31) of the control drive is in direct engagement with the pinion (73), and the other of the hollow wheel and the second wheel is in engagement with the pinion (73) by intermediary of an interposed wheel (74).

12. Chassis as claimed in claim 9, characterized in that the hollow drive control wheel (28), the second drive control wheel (31) and a shaft of a control drive hydraulic motor (33) are mounted in a control drive housing (75), which is mounted on a casing (43) of the portal gear (9) at a side of the differential planet reducer (25), which is provided with the hollow central wheel (27).

13. Chassis as claimed in claim 8, characterized in that the hollow shaft (22) is provided with gearings (34,35), which are in mesh with brake discs (36).

14. Chassis as claimed in claim 1, characterized in that the countershafts (8) are, by intermediary of intake wheels (37) of the portal gears (9) in mesh with toothed rims (39), which are mounted on drivers (40) of planet wheels of the differential planet reducers (25,26).

15. Chassis as claimed in claim 1, characterized in that a pinion (41) of the countershaft (8) of the portal gear (9) engages a hollow of the drive wheel (7), and a casing (43) of the portal gear (9) runs out into a supporting pin (44), on which the drive wheel (7) is mounted, and on face walls (45,46) thereof are mounted armature pins (47,48).

16. (Amended) Chassis as claimed in claim 15, characterized in that a tire (14) of the drive wheel (7) is mounted in a fork (15) of the main arm (2) in bearing sleeves (16) of roller bearings (17), which are fit on armature pins (47,48), and the casing (43) of the portal gear engages the hollow of drive wheel (7) above the fork (15).

17. Chassis as claimed in claim 1, characterized in that the lower arm (52) of the double arm balance wheel (51) is mounted on the main arm (2) by means of a lower pin (60), the axis of which is situated below and in front of the axis of the tensioning wheel journal (49).

18. Chassis as claimed in claim 1, characterized in that a stationary brake part (61) is mounted on the double arm balance wheel (51) and rotary brake part (62) is connected to the tensioning wheel (50).

19. Chassis as claimed in claim 18, characterized in that the stationary brake part is mounted on the double arm balance wheel (51) by means of the journal (49) of the tensioning wheel (50) and by means of a flange (76).

20. Chassis as claimed in claim 18, characterized in that a brake hub (65) is connected with the tensioning wheel (50), said brake hub being provided about its circumference with grooves (64), which are directed parallel with the axis of the tensioning wheel (50), and in said grooves (64) is mounted displaceably the brake hub.

21. Chassis as claimed in claim 1, characterized in that the drive wheel (7) is provided with fingers (85) situated at uniform distances in a groove (86) about the circumference of the drive wheel (7) between purifying orifices (87).

22. Chassis as claimed in claim 1, characterized in that a movable armature (77) is mounted on the main arm (2), and a stationary armature (78) is mounted on the body (82) of the tractor, both said armatures being connected by a brace (79).

23. Chassis as claimed in claim 1, characterized in that the bracket (6) is provided with a sliding plate (80) which passes through two vertical strips (81), which are mounted on the main arm (2).

24. Chassis as claimed in claim 23, characterized in that between the sliding plate (80) and at least one of the two vertical strips (81) is mounted a block, which is mounted on the sliding plate (80), as well as on one of the vertical strips (81).

25. A spring mounted tracked tractor chassis comprising:
 a pair of support arms mounted rotatably on a body of the tractor, each support arm being provided with a driving wheel, a tensioning wheel and running wheels, said running wheels being mounted on the support arm by means of spring mounted rockers;
 primary springs inserted between the support arms and the rockers; and
 secondary springs mounted on brackets of the tractor body, wherein the support arms are mounted movably such that the secondary springs lean against the support arms.

26. The chassis as claimed in claim 25, wherein each driving wheel is driven by a conical gearing by means of differential planetary reducers with a portal-type gearing being in mesh with the differential planetary reducers, wherein the axis of the driving wheel is positioned to the rear and below the axis of a countershaft of the portal-type gearing and the axis of the countershaft is positioned to the rear and below the axis of a ring gear of the conical gearing.

27. The chassis as claimed in claim 25, wherein the tensioning wheels each have a journal which carries a double arm balance beam, a lower arm of the double arm balance beam is mounted rotatably on the support arm, while an upper arm of the double arm balance beam is rotatably connected with a tension jack mounted on the support arm.

28. The chassis as claimed in claim 25, wherein the primary springs and the secondary springs are made in the form of air bellows, the filling of which is controlled by position controllers, and tie rods of which are provided with length adjusting devices connected to a spring mounting controller located in a cab of the tractor.

29. The chassis as claimed in claim 27, wherein the primary springs of the second to last of the running wheels are interconnected with the primary springs of the last of the running wheels via a pressure reducing valve, a control member of which is connected with a graded piston, said graded piston includes a chamber on one side thereof which is interconnected with the primary spring of the last running wheel, and a double chamber on a second side thereof, a first part of which is interconnected with the primary spring of the second to last of the running wheels, and a second part of which is interconnected with the cylinder of the tension jack.

30. The chassis as claimed in claim 25, wherein the first of the running wheels are connected with the second of the running wheels by means of connecting rocker beams which are mounted on the support arms by means of rockers having primary springs.

31. The chassis as claimed in claim 25, wherein between the rocker beams of the last of the running wheels and the support arm, a compensating hydraulic motor is interposed, which is interconnected with a cylinder of a tension jack by piping including a flow damper, the primary springs of both the first and the second of the running wheels are connected via a piping with the secondary spring and a rocker of the last of the running wheels is connected, by means of a primary damper, with the support arm, which is connected by means of a secondary damper with one of said brackets.

32. The chassis as claimed in claim 26, wherein a ring gear of the conical gearing is mounted on a tubular bracket, which is connected by an outer grooved driver and by an inner grooved driver with a hollow shaft, at the ends of which crown wheels of the differential planet reducers are mounted.

33. The chassis as claimed in claim 26, wherein one of the differential planet reducers has a hollow central wheel, which is connected to a hollow wheel of a control drive, in a hollow of the hollow wheel, of the hollow central wheel and of a hollow shaft a central shaft is mounted, the central shaft connects a central wheel of a second differential planet reducer to a second wheel of the control drive, said hollow wheel of the control drive and said second wheel of the control drive being in mesh by a common conical pinion, which is connected to a shaft of a hydraulic control motor.

34. The chassis as claimed in claim 33, wherein the hollow wheel of the control drive, the second wheel of the control drive and the shaft of the hydraulic control motor are mounted in a control drive housing, which is mounted on a casing of the portal-type gearing at the side of the differential planet reducer, which is provided with a hollow central wheel.

35. The chassis as claimed in claim 26, wherein a pinion of the countershaft of the portal-type gearing engages the hollow of the driving wheel, a casing of the portal-type gearing runs out into a supporting pin, on which the driving wheel is mounted, and on face walls thereof armature pins are mounted, a tire of the drive wheel is mounted in a fork of the support arm in sleeves of roller bearings, which are mounted on the armature pins, and the casing of the portal-type gearing engages a hollow of the drive wheel above the fork.

36. The chassis as claimed in claim 27, wherein the lower arm of the double armed balance beam is mounted on the support arm by means of a lower pin, an axis of which is situated below and behind an axis of a journal of tensioning wheel.

\* \* \* \* \*